Figure 1:
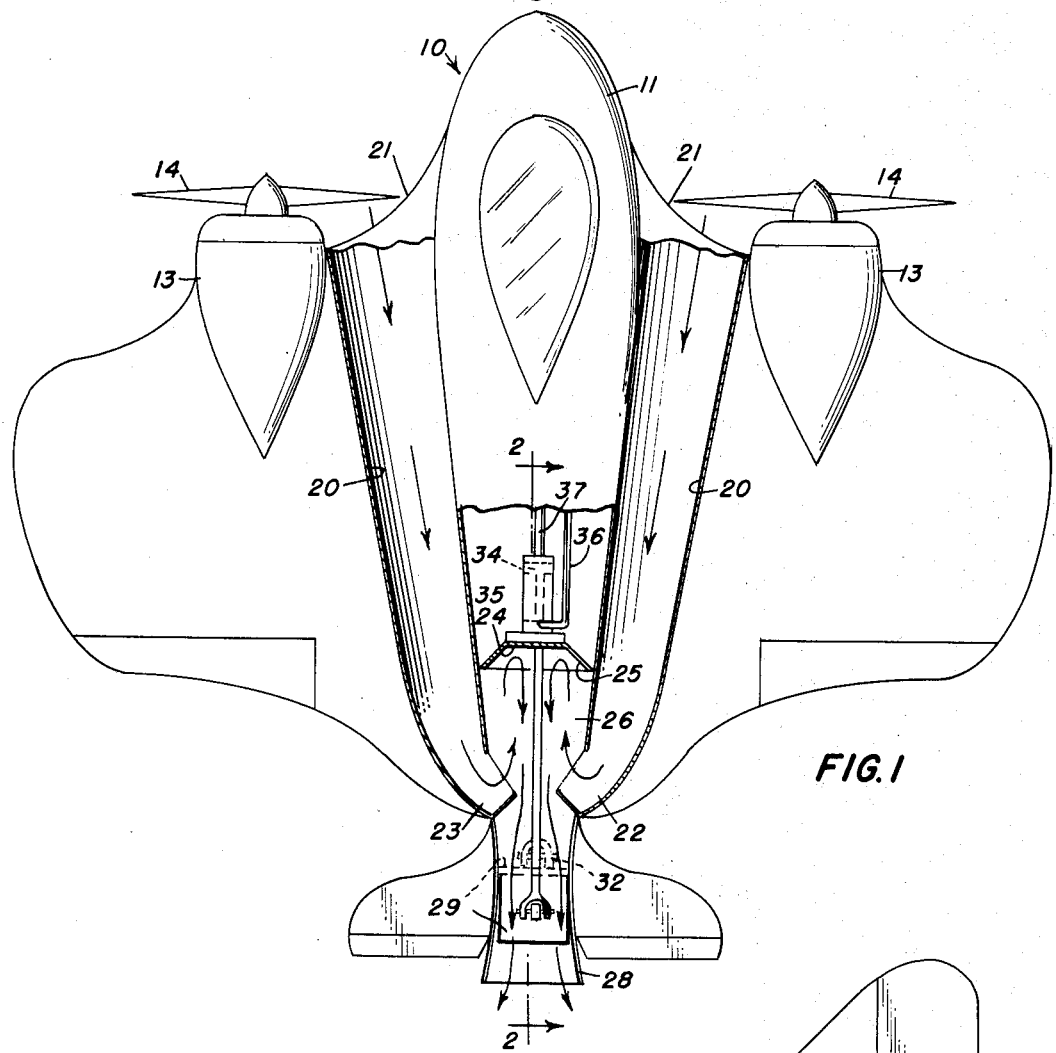

Oct. 4, 1955 — P. JONES — 2,719,683

AIRCRAFT WITH FLUID PROPULSION AND BRAKING MECHANISM

Filed Aug. 4, 1954

INVENTOR
PAUL JONES

BY *Gustave Miller*
ATTORNEY

United States Patent Office 2,719,683
Patented Oct. 4, 1955

2,719,683

AIRCRAFT WITH FLUID PROPULSION AND BRAKING MECHANISM

Paul Jones, Williamsport, Pa.

Application August 4, 1954, Serial No. 447,718

2 Claims. (Cl. 244—52)

This invention relates to aircraft propulsive means and has as its primary object the provision of a structure adapted to utilize the air stream created by the backwash of the propellers and the forward motion of the plane to add additional impetus to the forward progress of the plane.

An additional object of the invention is the provision of means whereby the air stream may be employed to reduce the speed of the plane by acting as a brake.

Still another object of the invention is the provision of means controllable by the pilot for controlling the direction of the force of the air stream.

Still other objects reside in the combination of elements, arrangements of parts and features of construction, all as will be more fully pointed out hereinafter and shown in the accompanying drawing wherein there is shown a preferred embodiment of this inventive aircraft.

Figure 2:
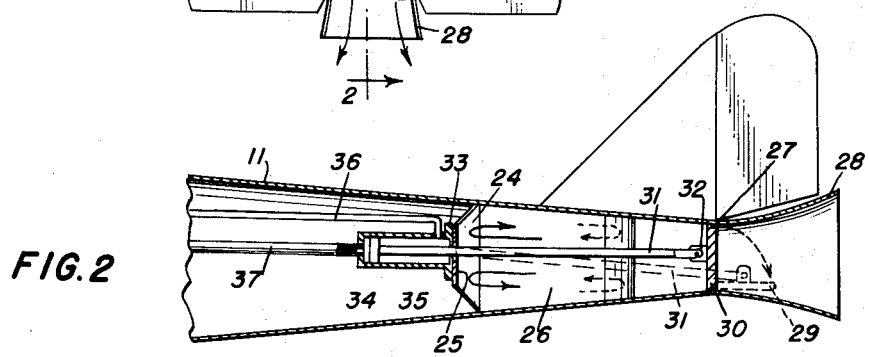

In the drawing:

Fig. 1 is a top plan view of an airplane equipped with the instant inventive parts thereof being shown in section, and Fig. 2 is a sectional view taken substantially along the line 2—2 of Fig. 1 as viewed in the direction indicated by the arrows.

Similar reference characters refer to similar parts throughout the several views of the drawing.

Referring now to the drawing in detail, and more particularly to Fig. 1, there is generally indicated at 10 an aircraft of any desired type, in the illustrative embodiment shown, a bi-motored propeller driven type.

The plane 10 includes a fuselage 11, wings 12, engine nacelles 13, housing engines provided with propellers 14 and a tail assembly comprised of the conventional vertical and horizontal control surfaces 15 and 16 respectively.

Lying along either side of fuselage 11 is an air duct or passage 20, each duct 20 being provided with a forward opening or air intake 21, it being noted that each intake 21 is positioned within the radius of a propeller 14 so as to receive the backwash therefrom.

Ducts 20 extend a substantial portion of the length of fuselage 11 and at their rear end curve inwardly into the fuselage as indicated at 22. Interiorly of the fuselage there are provided guide ducts 23 to direct the air stream forwardly against a baffle 24 having oppositely angled side portions 25, the direction of the air flow being indicated by the arrows in Fig. 1.

Baffle 24 defines an air chamber 26 having a rear opening 27 which normally opens into a flared tail pipe 28, but which may be closed when desired, for a purpose to be pointed out hereinafter by means of a pivoted gate valve 29 mounted on a pivot 30.

The position of gate 29 is controlled by means of an operating rod 31 pivotally connected to the gate 29 as shown at 32, the other end of rod 31 extending through a suitable bushing 33 in baffle 24 and terminating in a piston 34. Piston 34 is contained in a hydraulic cylinder 35 and is controlled selectively by the selective admission of hydraulic 36 and 37, under the control of the pilot of the aircraft.

In the use and operation of the device with gate 29 open, the flow of air through ducts 20 is directed against baffle 24, thus adding a forward thrust to the plane, and then is free to escape through tail pipe 28. With the gate 29 closed however, this additional thrust is nullified and the additional drag set up by the compression of air chamber 26 to serve as a brake to reduce the speed of the plane when desired, as, for example in landing.

Obviously this invention is applicable to any single or multiple engined plane, or to jet propelled aircraft.

From the foregoing it will now be seen that there is herein provided a device which accomplishes all of the objects of this invention and others including many advantages of great practical utility and commercial importance.

As many embodiments may be made of this inventive aircraft and as many modifications may be made in the embodiment herein shown and described, it is to be understood that all matter herein is to be interpreted merely as illustrative and not in a limiting sense.

Having thus set forth and disclosed the nature of this invention, what is claimed is:

1. In an aircraft having a fuselage, a longitudinally extending, substantially straight duct on either side of said fuselage each having a forward opening positioned to receive the backwash of a propeller, each duct curving at its rear end into the fuselage, a frusto-conical rearwardly diverging baffle in said fuselage closing the rear end of said fuselage and forming an air chamber, each duct having a forwardly opening aperture inside said fuselage, directing air forwardly against said baffle, said baffle directing air rearwardly again in the direction of its original flow, said air chamber having a rear opening permitting the rearward escape of said forwardly directed air and means for closing said rear opening, said means comprising a gate valve.

2. In an aircraft having a fuselage, a longitudinally extending, substantially straight duct on either side of said fuselage each having a forward opening positioned to receive the backwash of a propeller, each duct curving at its rear end into the fuselage, a frusto-conical rearwardly diverging baffle in said fuselage closing the rear end of said fuselage and forming an air chamber, each duct having a forwardly opening aperture inside said fuselage, for directing air forwardly against said baffle, said air chamber having a rear opening permitting the rearward escape of said forwardly directed air, a gate valve for closing said rear opening and hydraulic means for controlling said gate valve from the exterior of said air chamber.

References Cited in the file of this patent

UNITED STATES PATENTS

| | | |
|---|---|---|
| 996,627 | Eggert | July 4, 1911 |
| 1,229,410 | Campbell | June 12, 1917 |
| 1,422,384 | South | July 11, 1922 |

FOREIGN PATENTS

| | | |
|---|---|---|
| 574,873 | Great Britain | Jan. 24, 1946 |